United States Patent [19]

Hollerweger et al.

[11] Patent Number: 4,652,011
[45] Date of Patent: Mar. 24, 1987

[54] APPARATUS FOR STEERING AN AUTOMOTIVE VEHICLE

[75] Inventors: Heinz Hollerweger; Geert Kuipers; Peter Steiner; Josef Zahl, all of Ingolstadt, Fed. Rep. of Germany

[73] Assignee: Audi AG, Ingolstadt, Fed. Rep. of Germany

[21] Appl. No.: 812,194

[22] Filed: Dec. 23, 1985

[30] Foreign Application Priority Data

Dec. 22, 1984 [DE] Fed. Rep. of Germany ....... 3447042

[51] Int. Cl.⁴ .............................................. B62D 3/12
[52] U.S. Cl. .................................. 280/771; 280/96.1; 280/673; 280/95 A
[58] Field of Search ...................... 280/771, 779, 96.1, 280/671, 673, 674, 778, 778

[56] References Cited

U.S. PATENT DOCUMENTS 3,693,999  9/1972  Wood, Jr. ......................... 280/95 R
4,187,033  2/1980  Zukowski ......................... 280/95 R
4,531,426  7/1985  Iijima ..................................... 280/96

FOREIGN PATENT DOCUMENTS 767117  8/1951  Fed. Rep. of Germany .

Primary Examiner—Richard A. Bertsch
Attorney, Agent, or Firm—Karl Hormann

[57] ABSTRACT

The invention relates to a steering apparatus for automotive vehicles in which tie rods are connected to the motion transmitting device, e.g. a toothed rack, of a steering gear mechanism by way of elastic means, whereby the elastic means when subjected to thrust and/or compression transmit insignificant steering force only, the elastic means or the connecting member of the tie rods being mounted between deviation or deflection limiting devices of the motion transmitting device, there being provided a defined lost motion between the connecting member and the deflection limiting devices, there being no connection between the connecting device and the motion transmitting device for transmitting body noise.

19 Claims, 5 Drawing Figures

APPARATUS FOR STEERING AN AUTOMOTIVE VEHICLE

BACKGROUND OF THE INVENTION

The present invention relates generally to an automotive steering apparatus and more particularly to novel means for damping or reducing the level of noise otherwise transmitted from the front wheels or from the internal combustion engine of a vehicle to the interior thereof.

It is common knowledge that automotive vehicles are subject to noise of high frequency and low amplitude which, if allowed to penetrate into the passenger cabin, may make driving an unpleasant experience. Such noise may result from many different factors; but among its chief sources are the wheels interacting with more or less smooth road surfaces and/or the internal combustion engine. Attempts have, of course, not been lacking to seek means for breaking the chain of transmission of such noise between its source and the interior of automotive vehicles.

Thus it is conventional in steering mechanisms to provide tie rods for connecting the steering arms associated with the front wheels to the motion transmitting member of a steering gear mechanism comprising a bracket to which both tie rods may be connected and a moving member, and to provide elastic means between the bracket and the moving member.

West German patent specification DE-PS No. 767,117, for instance, discloses a rack and pinion steering mechanism in which the tie rods are connected to a forward portion of a toothed rack which functions as the moving member. Elastic means or rubber blocks are provided between each tie rod and the rack. During a steering operation these elastic means may be subjected to compression; but for purposes of maintaining a rigid connection between the tie rods, the intermediate elastic means notwithstanding, there is provided a rod which extends through the rack in a loosely guided manner to which joint portions of the tie rod joints are connected.

This arrangement is intended to dampen shocks generated by the front wheels, without adversely effecting their substantially parallel alignment. However, since in a steering operation steering force is transmitted by the elastic blocks, the blocks need to be made of relatively stiff material in order to avoid excessive lost motion or free play. This, however, may lead to the transmission of noise and/or vibrations of high frequency and low amplitude generated by the road surface and/or the engine into the interior of the vehicle, from the wheels and possibly the drive shafts to the steering mechanism by way of the tie rods and from the steering gear by way of the steering column. Also, the loosely guided rod in the rack constitutes a strong noise transmitter.

It is also well known elastically to mount the steering gear unit to the chassis or frame of automotive vehicles. Such elastic mounting may, however, result in undesirable movements of the steering gear unit during steering operations, i.e. when steering force is applied or transmitted. Also, such mounting cannot prevent the transmission of noise to the interior of the vehicle.

It is, therefore, an object of the invention to provide for an improved steering apparatus of the kind referred to which by simple means eliminates or at least substantially reduces the transmission of high frequency body vibrations.

Another object of the invention resides in the provision of novel means for reducing the level of transmission of high frequency body noise from the tie rods of an automotive steering mechanism to the steering gear.

A further object of the invention is to provide a novel high frequency noise damping arrangement in an automotive steering apparatus.

Yet another object of the invention resides in providing elastic means between tie rods and steering gear of an automotive vehicle which when subjected to thrust or compression transmit insignificant steering forces only.

A still further object of the invention is to provide an elastic connection between tie rods and motion transmitting device of a steering gear with a predetermined lost motion or free play.

SUMMARY OF THE INVENTION

In the accomplishment of these and other objects, the invention, in a prefered embodiment thereof, provides for a steering apparatus for automotive vehicles, comprising at least one tie rod having first and second end sections connected to a steering arm of a wheel and to a connecting means of a movable member of a steering gear mechanism, respectively, elastic means mounted intermediate the connecting means and the movable member, abutment means for limiting the amount of steering force transmissible by the elastic means, means for providing a predetermined amount of lost motion between the abutment means and the connecting means, and means for preventing the transmission of vibrations between the connecting means and the movable member.

Advantageously, the amount of lost motion is from about 50$\mu$ to about 500$\mu$. The steering gear mechanism may by a worm and sector or a worm wheel mechanism, or it may be a recirculating ball gearing system, or a rack and pinion mechanism. The elastic means may be a rotational thrust bearing mounted between a drive shaft and steering gear arm.

Other objects will in part be obvious and will in part appear hereinafter.

The invention accordingly comprises the system and apparatus possessing the features, technique and properties which are exemplified in the description to follow, and the scope of the application will be indicated by the appended claims.

BRIEF DESCRIPTION OF THE DRAWING

FIG. 1 depicts a steering apparatus of an automotive vehicle (not shown) comprising a steering column 2 having steering wheel 4 affixed thereto. The steering wheel serves, when rotated manually, by way of the steering column 2 to impart rotary motion to a schematically shown pinion 6 of a rack and pinion steering gear mechanism 8.

As shown, the pinion 6 meshes with a toothed rack 10. The rack 10 is mounted for axial movement within a housing 12 of the steering gear 8. The housing 12 of the steering gear 8 as well as the steering column 2 are mounted on the frame or chassis of the automotive vehicle in a conventional manner not shown here.

Figure 2:
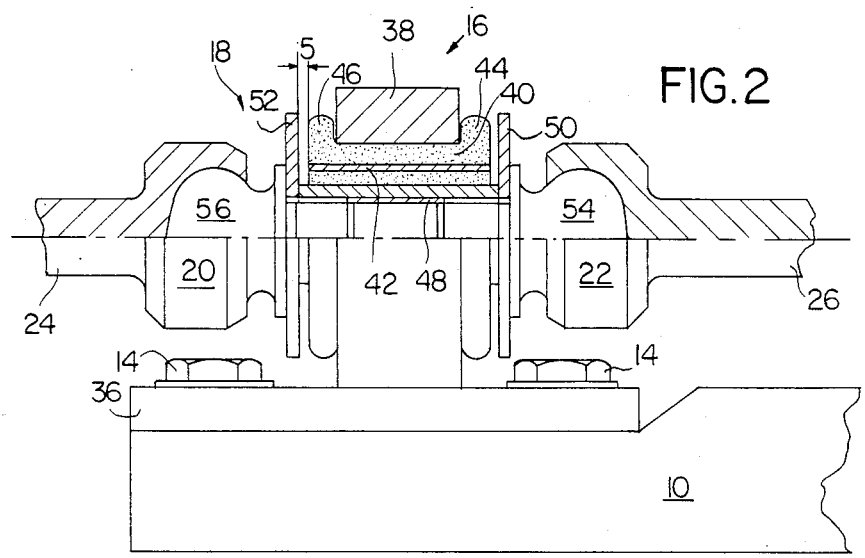
FIG. 2 is view, partially in an inverted section, on an enlarged scale, of the connecting member of the rack and pinion mechanism of FIG. 1.

An adapter 16 is mounted on the toothed rack 10 at an end thereof extending from the housing of the steering gear. The adapter 16 (FIG. 2), in turn, supports a connecting means 18 in a manner to be described. One each of a pair of tie rods 24, 26 is connected to the connecting means 18 by way of joints 20, 22. At their opposite ends the tie rods 24, 26 are connected to steering arms 28, 30, respectively. The steering arms 28, 30 are connected to pivotable wheel support spindles 32, 34 to impart steering motion thereto.

The adapter 16 is seen to comprise a flanged plate member 36 which supports a bearing bushing 38. The bushing 38 may be integrally formed with the plate member 36, or may be affixed thereto in any other appropriate manner.

Within an axial bore of the bushing 38 there is mounted an annularly shaped elastic thrust bearing 40 which, for purposes of increasing its axial stiffness, is provided with a sleeve 42, preferably made of a metal. In the arrangement shown, the bushing 38, the bearing 40, and the sleeve 42 are mounted coaxially. The bearing 40 is provided with collar members 44, 46 which extend axially beyond both ends of the bore of the bushing 38 as well as radially over at least part of the end surfaces surrounding the bore. The purpose of the resiliency or elasticity of the bearing 40 will become apparent hereinafter.

The connecting means 18 which supports the tie rods 24, 26 comprises an internally threaded sleeve 48. The joints 20, 22 are shown to be ball and socket joints, and bolts 54, 56 which are integral with the balls are threadedly secured in the sleeve 48. Between each end of the sleeve 48 and an adjacent flange of a bolt 54, 56 there is mounted on each bolt 54, 56 an abutment disc or washer 50, 52. It will be appreciated that the radial end surfaces of the bearing bushing 38 engaged by the collar members 44, 46 of the elastic bearing 40 and/or the radial surfaces of the washers 50, 52 constitute means for limiting the extent of deflection or movement of the tie rods 24, 26 relative to the bushing 38. However, in an unloaded condition, i.e. when no steering force is exerted, a predetermined amount of lost motion or free play is provided by a gap(s) between the washers 50, 52 and the radial collars 44, 46 respectively. The lost motion may, for example, be in the range of about 50μ to about 500μ.

Thus, within the range of the predetermined free play or lost motion(s) the elastic bearing 40 is subjected to axially acting shear only so that within this range the bearing remains highly elastic. If steering force is exerted, however, depending on its direction, one of the washers 50, 52 will move into engagement with the respective adjacent collar member 44 or 46 so that a large steering force or moment may be transmitted.

Figure 1:
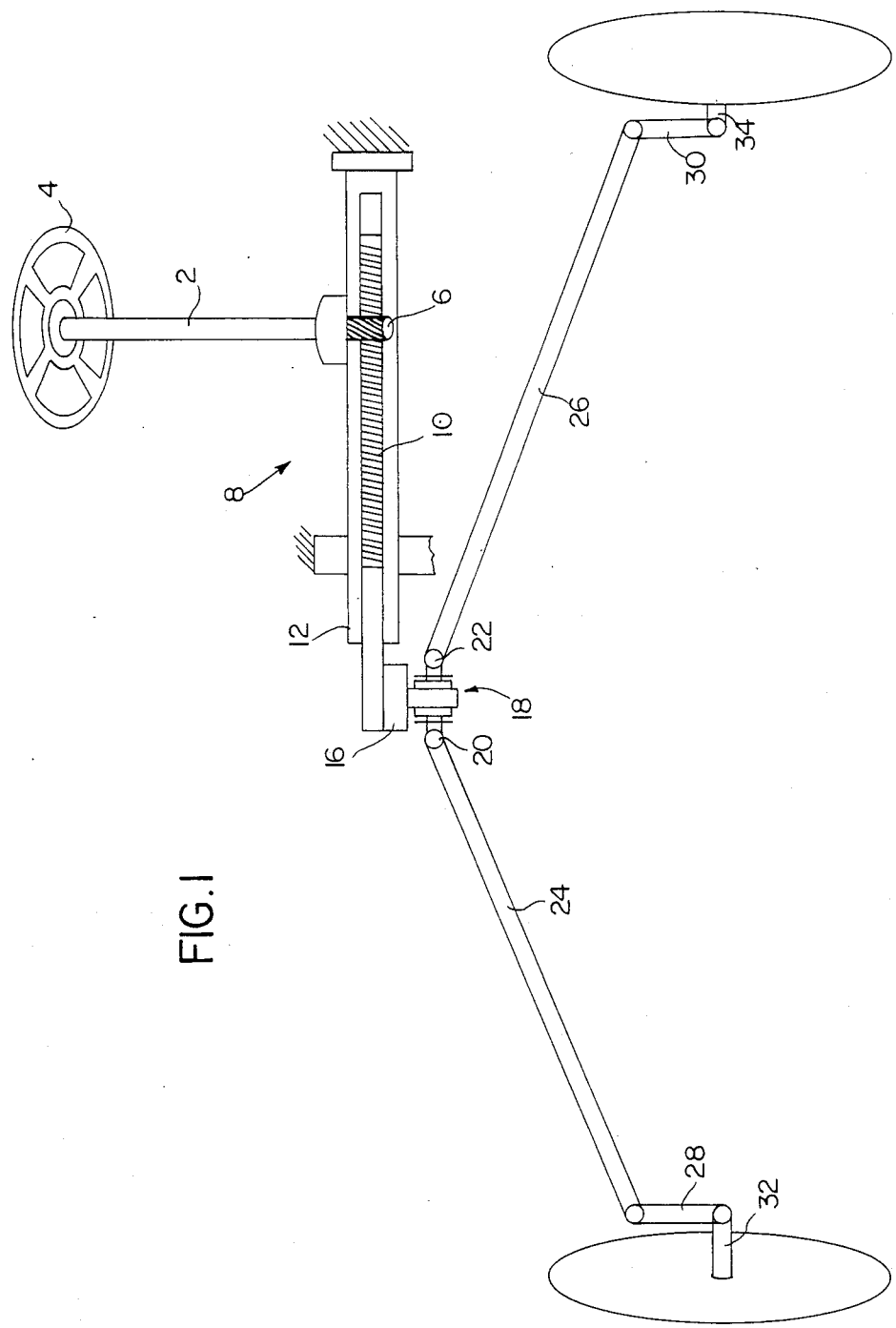
FIG. 1 is a schematic presentation of a steering apparatus in accordance with the invention as incorporated in a rack and pinion gearing mechanism.
Figure 4:
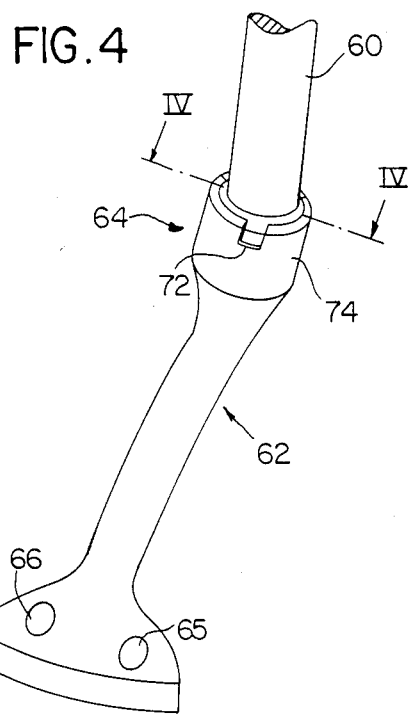
FIG. 4 is a detailed view on an enlarged scale of a steering gear arm and an associated drive shaft of the recirculating ball steering gear mechanism of FIG. 3.
Figure 5:
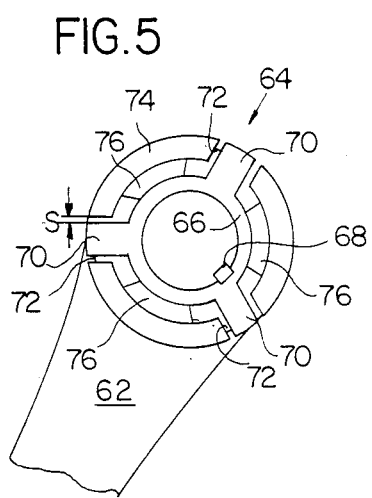
FIG. 5 is an enlarged sectional view along line IV—IV of FIG. 3.
Figure 3:
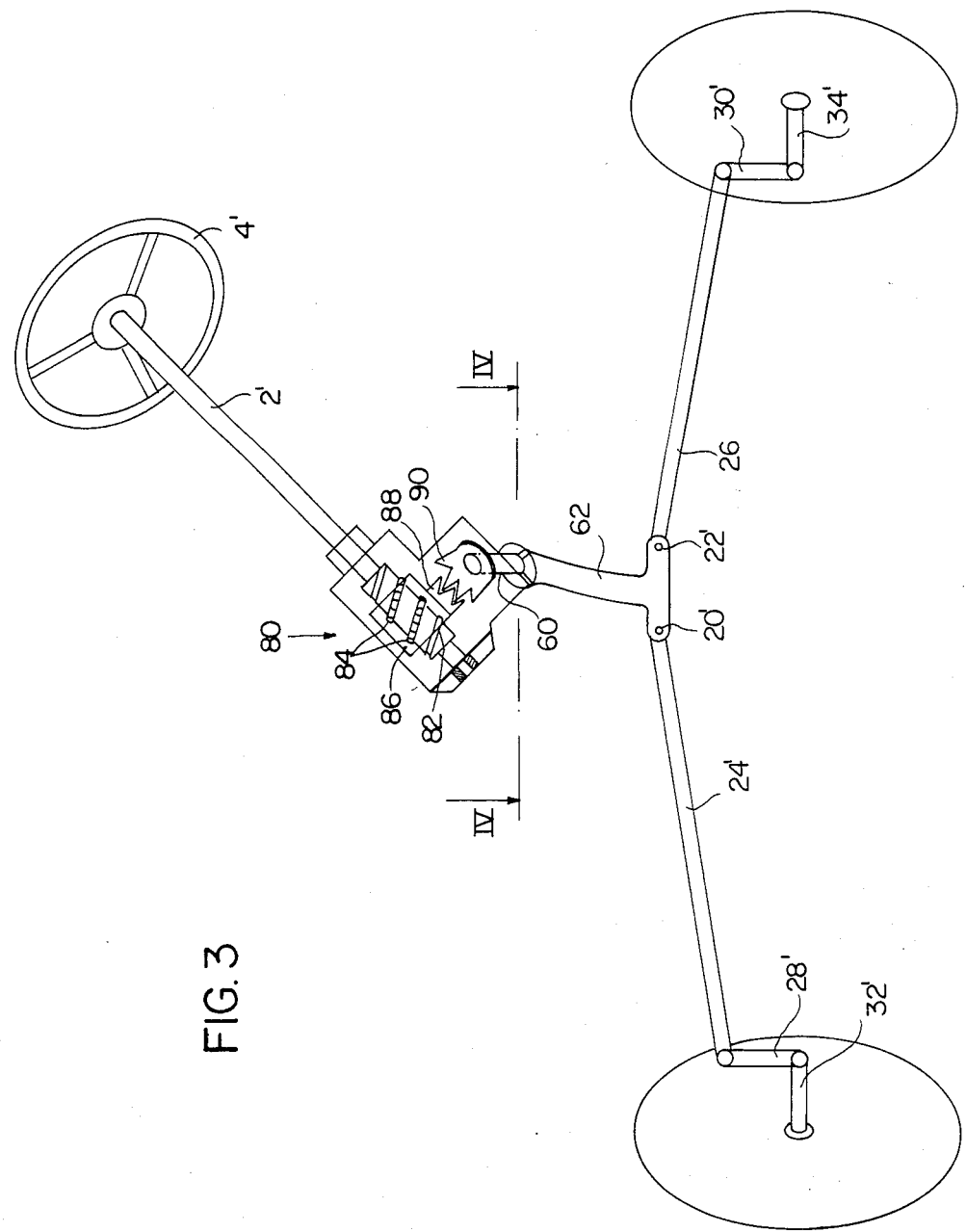
FIG. 3 is a schematic presentation of an alternate embodiment of the invention incorporated in a recirculating ball steering gear mechanism.

In the embodiment shown in FIGS. 3, 4 and 5 the movable member of the steering apparatus is depicted as a drive shaft 60 of, for instance, a recirculating ball gear mechanism as shown in FIG. 3. The drive shaft is connected to a steering gear arm 62. The arm 62, at an enlarged end section thereof, may be provided with bores 65 for connecting tie rods extending towards, and connected to, the front wheels of the automotive vehicle in an entirely conventional manner. As shown in FIG. 3 in which elements in common with those of the embodiment of FIG. 1 have been identified by the same reference numbers primed, the steering apparatus comprises a steering wheel 4' affixed to a steering column 2' which, in turn, is connected to a recirculating ball gearing mechanism 80. As is conventional, the mechanism 80 comprises a steering worm gear 82 with a sleeve 86 being internally threaded mounted coaxially thereon. Balls 84 are provided within the threads of the worm 82 and the sleeve 86 so that rotation of the worm 82 causes axial displacement of the sleeve 86. A toothed member 88 is affixed to the sleeve 86 and meshes with a toothed segment 90 affixed to the drive shaft 60'. Thus, movement of the sleeve 86 causes rotational movement of the drive shaft 60' and the steering gear arm 62' connected thereto. Tie rods 24', 26' are connected to the arm 62' by means of joints 20', 22'. At their opposite ends the tie rods 24', 26' are, of course connected to steering arms 32', 34'.

As shown in detail in FIG. 4, the drive shaft 60 is connected to the steering gear arm 62 by way of a rotational thrust or shear bearing 64 provided with deflection limiting members.

The rotational thrust bearing 64 comprises an inner sleeve member 66 which is affixed to the shaft 60 by a feather or wedge 68. Hence, the sleeve 66 cannot rotate relative to the shaft 60. A nut (not shown) may further secure the sleeve 66 on the shaft 60. The sleeve 66 is provided with a plurality of, for instance three, radial protrusions 70 which are seated in axially extending grooves 72 of a collar 74 extending axially from an end of the steering gear arm 62 opposite the enlarged end thereof. To provide for limited relative rotation or lost motion(s) of about 250μ for instance, the grooves 72 are wider than the protrusions 70. A plurality of elastic members 76 is seated between the peripheral surface of the sleeve 66 and the opposite inner surface of the collar 74. These elastic members 76, when not subjected to rotational shear or thrust, provide for an elastic connection between the steering gear arm 62 and the drive shaft 60 and prevent the transmission of vibrations or body noise between these elements. As will be appreciated, the elastic or resilient members 76 become stressed or loaded during relative rotation between the shaft 60 and the arm 62 as determined by gap(s); i.e. tangential movement in opposite directions takes place between the inner and outer peripheral surfaces of the resilient members 76.

Hence, when the elastic elements 76 are in an unstressed condition body noise of high frequency and low amplitude will be isolated within the range of free play or gap(s) and transmission of such noise to the drive shaft 60 is substantially prevented. When steering force is exerted the protrusions 70 move into engagement with one side of the respective grooves 72 for the direct transmission of the steering force or moment.

It would be within the scope of the invention, for instance under structural constraints, to subject the elastic members to pressure instead of shear forces. In such cases, the requisite elasticity of the elastic members may be attained for instance, by recesses or cavities in the members. It will be appreciated by those skilled in the art that a preferred material for the elastic members is rubber.

As used herein, shear or thrust are intended to connote forces tangentially affecting offset portions of an elastic member in opposite directions. Pressure, by contrast, is intended to mean forces tending to compress or expand an elastic member thus leading to increased hardness thereof. Such increase in hardness may be minimized, however, by the provision of recesses or cavities within the member.

The advantages of the steering apparatus in accordance with the invention are believed to be clear. For instance, it will be appreciated that by providing the elastic members between the adapter and the connecting means it may be possible to manufacture them separately from the steering mechanism and to mount them as accessories. Moreover; by providing the elastic member as an annular sleeve seated coaxially relative to a threaded sleeve for mounting the ball and socket joints of the tie rods, a simple means is provided for adjusting or aligning the front wheels of an automotive vehicle.

Since certain changes may be made in the steering apparatus described above without departing from the scope of the invention disclosed, it is intended that all matter contained in the description or shown in the accompanying drawings be interpreted as illustrative and not in a limiting sense.

What is claimed is:

1. An apparatus for steering a pair of wheels mounted for rotation in substantially parallel planes and generating high frequency low amplitude vibrations, said apparatus comprising:
    a rotatably mounted steering column having manually actuable drive means rigidly mounted at one end thereof;
    means movable from a first position to another position in response to rotation of said steering column;
    tie rod means for transmitting steering movement from said movable means to said pair of wheels;
    means for providing a lost motion connection of predetermined extent between said steering column and said tie rod means; and
    resilient means for maintaing said lost motion connection means at a position substantially half-way said predetermined extent when said movable means is in its said first position, thereby preventing transmission of said high frequency low amplitude vibrations to said steering column.

2. The apparatus of claim 1, wherein said resilient means comprises rubber.

3. The apparatus of claim 1, wherein said movable means comprises recirculating ball steering gear means including a rotatable output member connected to a steering gear arm by said lost motion connection to provide limited rotation relative thereto and wherein said tie rod means is connected to said steering gear arm.

4. The apparatus of claim 3, wherein said rotatable output member comprises a shaft having a plurality of radial protrusions and wherein said steering gear arm is provided with a bore having a plurality of peripheral grooves and wherein said shaft is seated within said bore with the said protrusions nesting in said grooves.

5. The apparatus of claim 4, wherein the diameter of said shaft is less than the diameter of said bore and wherein said resilient means is mounted between said shaft and the peripheral wall of said bore.

6. The apparatus of claim 5, wherein said shaft is coaxially received within said bore.

7. The apparatus of claim 6, wherein said grooves are wider than said protrusions, said protrusions being substantially centrally positioned within said grooves when said movable means is in its said first position.

8. The apparatus of claim 7, wherein there is provided a gap of about $50\mu$ to about $500\mu$ between adjacent circumferentially disposed surfaces of said grooves and said protrusions.

9. The apparatus of claim 8, wherein said gap measures about $250\mu$.

10. The apparatus of claim 1, wherein said movable means comprises rack and pinion steering gear means including adapter means mounted on the rack of said rack and pinion steering gear means for movement thereby in opposite directions relative to a first position, said adapter means supporting bearing means having a bore extending substantially parallel to said directions for receiving, from opposite ends thereof, means for connecting to said tie rod means, said connecting means being axially movable within said bore thereby providing said lost motion connection.

11. The apparatus of claim 10, wherein said resilient means comprises sleeve means seated within said bore and provided with radial collars extending axially from opposite ends of said bore.

12. The apparatus of claim 11, wherein said resilient means comprises rubber.

13. The apparatus of claim 11, wherein said resilient sleeve means is mounted coaxially within said bore and has substantially coaxially embedded therein an axially incompressible sleeve.

14. The apparatus of claim 13, further comprising threaded sleeve means coaxially arranged within said resilient sleeve means, and wherein said connecting means comprises threaded bolts threadedly seated within said threaded sleeve means from opposite ends thereof.

15. The apparatus of claim 14, wherein said bolts are provided with ball-like heads and wherein said links comprise tie rods provided with sockets seated on said ball-like heads.

16. The apparatus of claim 15, wherein abutment means are provided between said heads and said radial collars.

17. The apparatus of claim 16, wherein said abutment means comprises annular discs mounted on said bolts.

18. The apparatus of claim 17, wherein said discs are spaced from said radial collars from about $50\mu$ to about $500\mu$.

19. The apparatus of claim 18, wherein said discs are spaced from said radial collars about $50\mu$.

* * * * *